(12) United States Patent
Ide et al.

(10) Patent No.: US 11,235,428 B2
(45) Date of Patent: Feb. 1, 2022

(54) FLUX-FREE BRAZING ALUMINUM ALLOY BRAZING SHEET

(71) Applicants: UACJ Corporation, Tokyo (JP); DENSO CORPORATION, Kariya (JP)

(72) Inventors: Tatsuya Ide, Tokyo (JP); Yutaka Yanagawa, Tokyo (JP); Shogo Yamada, Kariya (JP); Takahiro Shinoda, Kariya (JP); Shingo Ono, Kariya (JP)

(73) Assignee: UACJ CORPORATION, Tokyo (JP)

( * ) Notice: Subject to any disclaimer, the term of this patent is extended or adjusted under 35 U.S.C. 154(b) by 0 days.

(21) Appl. No.: 16/977,900

(22) PCT Filed: Mar. 5, 2019

(86) PCT No.: PCT/JP2019/008641
§ 371 (c)(1),
(2) Date: Sep. 3, 2020

(87) PCT Pub. No.: WO2019/172257
PCT Pub. Date: Sep. 12, 2019

(65) Prior Publication Data
US 2021/0039207 A1     Feb. 11, 2021

(30) Foreign Application Priority Data

Mar. 7, 2018   (JP) .............................. JP2018-040917

(51) Int. Cl.
| B32B 15/01 | (2006.01) |
| B23K 35/28 | (2006.01) |
| B23K 35/02 | (2006.01) |

(52) U.S. Cl.
CPC ........ *B23K 35/288* (2013.01); *B23K 35/0233* (2013.01); *B32B 15/011* (2013.01); *B32B 15/016* (2013.01); *Y10T 428/12764* (2015.01)

(58) Field of Classification Search
None
See application file for complete search history.

(56) References Cited

U.S. PATENT DOCUMENTS

| 2012/0177947 A1 | 7/2012 | Abrahamsson et al. |
| 2012/0237793 A1* | 9/2012 | Baumann ................. C22C 21/02 428/654 |
| 2015/0165564 A1* | 6/2015 | Ahl .......................... C22C 21/02 428/654 |
| 2017/0151637 A1 | 6/2017 | Ichikawa et al. |
| 2018/0111232 A1* | 4/2018 | Shibuya .................. C22C 21/12 |

FOREIGN PATENT DOCUMENTS

| CN | 104395028 A | 3/2015 |
| JP | 2013-1941 A | 1/2013 |
| JP | 2013-505135 A | 2/2013 |
| JP | 2013-233552 A | 11/2013 |
| JP | 2014-104509 A | 6/2014 |
| JP | 2015-528852 A | 10/2015 |
| WO | 2016/017716 A1 | 2/2016 |
| WO | 2017/208940 A1 | 12/2017 |

OTHER PUBLICATIONS

International Search Report dated Jun. 11, 2019, issued in counterpart International Application No. PCT/JP2019/008641. (1 page).
Office Action dated Jul. 19, 2021, issued in counterpart CN application No. 201980017524.2, with English translation. (13 pages).

* cited by examiner

*Primary Examiner* — Daniel J. Schleis
(74) *Attorney, Agent, or Firm* — Westerman, Hattori, Daniels & Adrian, LLP

(57) ABSTRACT

A flux-free brazing aluminum alloy brazing sheet includes: a core material formed of aluminum alloy comprising Si of 0.50 to 0.90 mass %, Cu of 0.30 to 2.50 mass %, and Mn of 1.40 to 1.80 mass %, with a Mg content limited to 0.05 mass % or less, and with the balance being Al and inevitable impurities; an intermediate material being formed of aluminum alloy comprising Mg of 0.40 to 1.00 mass %, and Zn of 2.00 to 6.00 mass %, with the balance being Al and inevitable impurities; and a brazing material being formed of aluminum alloy comprising Si of 6.00 to 13.00 mass %, Mg of 0.05 to 0.40 mass %, and Bi of 0.010 to 0.050 mass %, with the balance being Al and inevitable impurities.

4 Claims, No Drawings

FLUX-FREE BRAZING ALUMINUM ALLOY BRAZING SHEET

TECHNICAL FIELD

The present invention relates to an aluminum alloy brazing sheet used for brazing in an inert gas atmosphere without using a flux, and an aluminum alloy brazing sheet having excellent strength and internal corrosion resistance.

BACKGROUND ART

As a brazing method for aluminum materials, a flux brazing method of performing brazing by applying a flux to a surface of a joining portion is frequently used. In the method, because the flux and/or the residue thereof adhere(s) the surface of the aluminum product after brazing is finished, the flux and/or the residue thereof may cause a problem in the aluminum product for certain use. For example, a problem may occur in heat exchangers equipped with electronic components. Examples of the problem includes deterioration in surface treatability due to the flux residue in manufacturing thereof. As another example, a problem may occur, such as occurrence of clogging caused by the flux or the like in the coolant channel, in water-cooled heat exchangers. In addition, to remove the flux and/or the residue thereof, it is required to perform pickling, and the burden of the cost for the pickling has been regarded as a problem in recent years.

To avoid the problems described above accompanying use of a flux, there are cases where a vacuum brazing method is adopted for aluminum products of some uses.

The vacuum brazing method is a method of performing brazing in vacuum without applying a flux to the surface of the joining portion. However, the vacuum brazing method has a problem in that productivity is lower than that of the flux brazing method, or a problem in that the quality of brazing joint easily deteriorates. In addition, brazing furnaces used for vacuum brazing methods require a higher cost of equipment and maintenance in comparison with ordinary brazing furnaces.

For this reason, a flux-free brazing method has been proposed. The flux-free brazing method is a method of performing brazing in an inert gas atmosphere without applying a flux to the surface of the joining portion. A brazing sheet used for the flux-free brazing method comprises an element having a function of weakening or breaking an oxide film in at least one layer of a stacked structure thereof. Mg is frequently used as the element of this type.

Mg added to the brazing material promptly reacts with the oxide film existing on the surface of the brazing material at the initial stage of brazing, in brazing in an inert gas atmosphere. In this manner, the oxide film existing on the surface of the brazing material is weakened before the brazing material is molten. However, it is known that, when the Mg addition amount in the brazing material is large, Mg reacts with oxygen in the inert gas atmosphere, that a firm oxide film is formed on the surface of the brazing material, and that brazability deteriorates.

Patent Literature 1 discloses a heat exchanger used for cooling a semiconductor element. The heat exchanger comprises a plurality of cooling pipes formed by subjecting a pair of plate-shaped members to brazing joint, the semiconductor element is disposed to be held in a clearance space formed between the cooling pipes, and the semiconductor element is cooled by circulating cooling water in the cooling pipes.

In addition, in Patent Literature 1, the heat exchanger is formed by subjecting constituent members, such as plate-shaped members, to brazing joint using a brazing sheet formed of a clad material in which a brazing material comprising no Mg is cladded onto a core material, with a sacrificial anode material comprising Mg interposed therebetween. Patent Literature 1 discloses that brazing joint is enabled under an environment of a low oxygen concentration without requiring application of a flux, because Mg of the sacrificial anode material layer is diffused in brazing joint and the oxide film is broken by a reduction effect of Mg. Patent Literature 1 also discloses the effect that oxidization of Mg itself and formation of an oxide film are prevented, because Mg is not exposed in a surface layer portion exposed to the air.

Patent Literature 2 discloses a brazing sheet in which a brazing material comprising Si and Li is cladded onto one side surface of an aluminum alloy core material, with an intermediate layer comprising Mg interposed therebetween. Patent Literature 2 discloses that aluminum can be brazed in an inert gas atmosphere without using a flux.

PRIOR ART LITERATURES

Patent Literatures

[Patent Literature 1] Japanese Patent Publication 2013-001941-A
[Patent Literature 2] Japanese Patent Publication 2013-233552-A

SUMMARY

Solution to Problem

However, the brazing sheet disclosed in Patent Literature 1 has the problem that brazing failure occurs, because the Mg amount diffused from the intermediate layer to the surface of the brazing material is small and the oxide film cannot be sufficiently broken when the brazing material surface and the core material surface of the material are brazed.

In addition, in Patent Literature 2, the brazing material comprises Li. The structure of Patent Literature 2 has a problem in that a crack easily occurs in the ingot when an aluminum alloy comprising Li is casted.

Accordingly, an object of the present invention is to provide an aluminum alloy brazing sheet used for brazing in an inert gas atmosphere without using a flux, and having good brazability when the core material and the brazing material are brazed.

Means for Solving the Problem

Specifically, the present invention (1) provides an aluminum alloy brazing sheet used for brazing in an inert gas atmosphere without using a flux, comprising:
a core material;
an intermediate material cladded onto one side surface of the core material; and
a brazing material cladded onto a side surface of the intermediate material opposite to a side surface on which the core material exists, wherein
the core material is formed of aluminum alloy comprising Si of 0.50 to 0.90 mass %, Cu of 0.30 to 2.50 mass %, and Mn of 1.40 to 1.80 mass %, with a Mg content limited to 0.05 mass % or less, and with the balance being Al and inevitable impurities, the intermediate material is formed of aluminum alloy comprising Mg of 0.40 to 1.00 mass %, and Zn of 2.00 to 6.00 mass %, with the balance being Al and inevitable impurities, and the brazing material is formed of aluminum alloy comprising Si of 6.00 to 13.00 mass %, Mg of 0.05 to 0.40 mass %, and Bi of 0.010 to 0.050 mass %, with the balance being Al and inevitable impurities.

The present invention (2) provides the aluminum alloy brazing sheet according to (1), wherein the brazing material further comprises Sr of 0.001 to 0.05 mass %.

The present invention (3) provides the aluminum alloy brazing sheet according to any one of (1) and (2), wherein the brazing material further comprises Cu of 0.02 to 1.20 mass %.

The present invention (4) provides the aluminum alloy brazing sheet according to any one of (1) to (3), wherein the intermediate material further comprises Mn of 0.05 to 0.50 mass %.

Effects of Invention

According to the present invention, an aluminum alloy brazing sheet used for brazing in an inert gas atmosphere without using a flux, and having good brazability when the core material and the brazing material are brazed, can be provided.

EMBODIMENTS

An aluminum alloy brazing sheet according to the present invention is an aluminum alloy brazing sheet used for brazing in an inert gas atmosphere without using a flux, comprising:

a core material;

an intermediate material cladded onto one side surface of the core material; and a brazing material cladded onto a side surface of the intermediate material opposite to a side surface on which the core material exists, wherein the core material is formed of aluminum alloy comprising Si of 0.50 to 0.90 mass %, Cu of 0.30 to 2.50 mass %, and Mn of 1.40 to 1.80 mass %, with a Mg content limited to 0.05 mass % or less, and with the balance being Al and inevitable impurities, the intermediate material is formed of aluminum alloy comprising Mg of 0.40 to 1.00 mass %, and Zn of 2.00 to 6.00 mass %, with the balance being Al and inevitable impurities, and the brazing material is formed of aluminum alloy comprising Si of 6.00 to 13.00 mass %, Mg of 0.05 to 0.40 mass %, and Bi of 0.010 to 0.050 mass %, with the balance being Al and inevitable impurities.

The aluminum alloy brazing sheet according to the present invention comprises a core material, an intermediate material cladded onto one side surface of the core material, and a brazing material cladded onto a side surface of the intermediate material opposed to a side surface on which the core material exists. Specifically, the aluminum alloy brazing sheet according to the present invention is a three-layer clad material in which the core material, the intermediate material, and the brazing material are cladded in this order.

The aluminum alloy brazing sheet according to the present invention is an aluminum alloy brazing sheet used for brazing in an inert gas atmosphere without using a flux. In addition, the aluminum alloy brazing sheet according to the present invention is a clad material used for manufacturing a product by forming an aluminum alloy brazing sheet into a shape of the product, thereafter combining the aluminum alloy brazing sheet with other components, and subjecting the structure to brazing heating to perform brazing, and used for manufacturing of a product including a portion in which the core material and the brazing material of the aluminum alloy brazing sheet are brazed.

The core material of the aluminum alloy brazing sheet according to the present invention is formed of aluminum alloy comprising Si of 0.50 to 0.90 mass %, Cu of 0.30 to 2.50 mass %, and Mn of 1.40 to 1.80 mass %, with a Mg content thereof limited to 0.05 mass % or less, and with the balance being Al and inevitable impurities.

Si in the core material has a function of improving the strength of the core material by solid-solution strengthening and fine precipitation hardening and strengthening of an Al—Mn—Si based intermetallic compound. The Si content in the core material is 0.50 to 0.90 mass %, and preferably 0.60 to 0.80 mass %. When the Si content in the core material is less than the range described above, the effect is not sufficient. When the Si content exceeds the range described above, the melting point of the core material is lowered, and local melting easily occurs in brazing.

Cu in the core material improves the strength of the core material, makes the potential of the core material positive, increases the difference in potential from the intermediate material and the difference in potential from the brazing material, and improves corrosion resistance. In addition, Cu in the core material is diffused into the intermediate material and the brazing material in brazing heating to form gentle Cu concentration gradient. In this manner the potential becomes positive on the core material side, the potential becomes negative on the intermediate material surface side, gentle potential distribution is formed in the thickness direction of the intermediate material, and the corrosion form thereof is set to a general corrosion type. The Cu content in the core material is 0.30 to 2.50 mass %, and preferably 0.60 to 0.90 mass %. When the Cu content in the core material is less than the range described above, the effect is small. When the Cu content exceeds the range described above, corrosion resistance of the core material decreases, and the melting point thereof is lowered to cause local melting in brazing heating.

Mn in the core material improves the strength of the core material, makes the potential of the core material positive, increases the difference in potential from the intermediate material, and improves corrosion resistance. The Mn content in the core material is 1.40 to 1.80 mass %, and preferably 1.50 to 1.70 mass %. When the Mn content in the core material is less than the range described above, the effect is small. When the Mn content exceeds the range described above, coarse compound is generated in casting, rollability is deteriorated, and consequently difficulty occurs in acquisition of a sound sheet material.

The Mg content in the core material is limited to 0.05 mass % or less. The Mg content in the core material limited to 0.05 mass % or less suppresses oxidization of the core material with Mg, and suppresses deterioration in brazability due to oxidization of the surface of the core material when the core material and the brazing material are brazed.

The brazing material of the aluminum alloy brazing sheet according to the present invention is formed of aluminum alloy comprising Si of 6.00 to 13.00 mass %, Mg of 0.05 to 0.40 mass %, and Bi of 0.01 to 0.05 mass %, with the balance being Al and inevitable impurities.

Si in the brazing material lowers the melting point of Al, increases flowability, and causes the brazing filler metal to exhibit the function thereof. The Si content in the brazing material is 6.00 to 13.00 mass %, and preferably 9.00 to 12.50 mass %. When the Si content in the brazing material is less than the range described above, the flowability decreases, and the brazing material does not effectively function as brazing filler metal. When the Si content exceeds the range described above, erosion of the core material or the other joined portions increases.

Mg in the brazing material has a function of breaking the oxide film existing on the surface of the brazing material or the oxide film of the brazing target portion at a stage of brazing, and is capable of weakening the oxide film. For this reason, Mg in the brazing material improves the brazability. The Mg content in the brazing material is 0.05 to 0.40 mass %, and preferably 0.05 to 0.20 mass %. When the Mg content in the brazing material is less than the range described above, the effect described above is not sufficient. When the Mg content exceeds the range described above, oxygen in the brazing atmosphere reacts with Mg to form MgO, causing deterioration in brazability.

Bi in the brazing material is capable of decreasing the surface tension of the brazing filler metal, and increasing flowability of the brazing filler metal. In addition, because Mg and Bi coexist in the brazing filler metal, these elements synergistically act, and the fillet formation speed is improved. As a result, with the brazing material comprising Mg and Bi, a good fillet is promptly formed in a joining portion. The Bi content in the brazing material is 0.010 to 0.050 mass %, and preferably 0.010 to 0.030 mass %. When the Bi content in the brazing material is less than the range described above, the effect described above is not sufficient. When the Bi content exceeds the range described above, a coarse Mg—Bi-based compound is generated in casting, rollability is deteriorated, and difficulty occurs in acquisition of a sound sheet material.

The brazing material may further comprise Sr of 0.001 to 0.05 mass %, and preferably 0.01 to 0.03 mass %, if necessary. The Sr content in the brazing material falling within the range described above has a function of reducing the particle size of Si particles in the brazing material, and suppressing local melting and/or penetration of the intermediate material in brazing heating. When the Sr content is less than the range described above, the effect described above is not sufficient. When the Sr content exceeds the range described above, oxidization of the surface of the brazing material progresses, a firm oxide film is formed, causing deterioration in brazability.

The brazing material may further comprise Cu of 0.02 to 1.20 mass %, and preferably 0.10 to 0.50 mass %, if necessary. Cu in the brazing material is concentrated in the joining portion when it is solidified in the process of brazing, and makes the pitting potential of the joining portion positive. With use of Al—Zn-based alloy for the intermediate layer material, the problem that Zn is concentrated in the joining portion, the pitting potential is made negative, and the joining portion is corroded with priority, is solved by making the pitting potential positive by concentration of Cu in the joining portion, and priority corrosion is suppressed. When the Cu content in the brazing material is less than the range described above, the effect described above is not sufficient. When the Cu content exceeds the range described above, the strength of the brazing material increases, the brazing material is not joined to the intermediate material in clad rolling, and difficulty occurs in acquisition of a sound sheet material.

The intermediate material of the aluminum alloy brazing sheet according to the present invention is formed of aluminum alloy comprising Mg of 0.40 to 1.00 mass %, and Zn of 2.00 to 6.00 mass %, with the balance being Al and inevitable impurities.

Mg in the intermediate material is slowly diffused into the brazing material during brazing heating, and rapidly diffused toward the surface of the brazing material simultaneously with start of melting (strictly, partial melting of ternary eutectic of Al—Si—Mg) of brazing filler metal. For this reason, the oxide film is weakened without formation of MgO on the surface of the brazing material. The Mg content in the intermediate material is 0.40 to 1.00 mass %, and preferably 0.50 to 0.80 mass %. When the Mg content in the intermediate material is less than the range described above, the effect described above is not sufficient. When the Mg content exceeds the range described above, the melting point of the intermediate material is lowered, and partial melting occurs.

Zn in the intermediate material makes the potential of the intermediate material negative, retains the sacrificial anode effect for the core material, and prevents pining and/or crevice corrosion of the core material. The Zn content in the intermediate material is 2.00 to 6.00 mass %, and preferably 2.00 to 5.00 mass %. When the Zn content in the intermediate material is less than the range described above, the effect of Zn is not sufficient. When the Zn content exceeds the range described above, the corrosion speed becomes too fast, the intermediate material is eliminated in an early stage, and corrosion resistance deteriorates.

The intermediate material may further comprise Mn of 0.05 to 0.50 mass %, and preferably 0.20 to 0.40 mass %, if necessary. Mn in the intermediate material increases the strength of the intermediate material, and improves the joining property in clad rolling. When the Mg content in the intermediate material is less than the range described above, the effect described above is not sufficient. When the Mn content exceeds the range described above, the strength of the intermediate material becomes too high, and the joining property in clad rolling deteriorates.

The method for manufacturing an aluminum alloy brazing sheet according to the present invention will be described hereinafter. The aluminum alloy brazing sheet according to the present invention is manufactured by preparing alloy ingots having the compositions described above, and performing cladding such that an intermediate material formed of alloy of the composition described above and a brazing material formed of alloy of the composition described above are stacked in this order on one side surface of a core material formed in a sheet shape.

First, ingots are prepared by melting and casting respective aluminum alloys having desired chemical compositions used for the core material, the intermediate material, and the brazing material. The methods for melting and casting them are not specifically limited, but ordinary methods are used.

Thereafter, the aluminum alloy for the core material and the aluminum alloy for the intermediate material are not subjected to homogenization, or subjected to homogenization at 600° C. or less, and the aluminum alloy for the brazing material and the aluminum alloy for the intermediate material are subjected to hot rolling at 400 to 500° C. to respective predetermined thicknesses by a conventional method. Thereafter, the aluminum alloy for the core material, the aluminum alloy for the intermediate material, and the aluminum alloy for the brazing material are combined in this order, subjected to hot rolling into a clad material at 400 to 500° C. by a conventional method, and subjected to cold rolling to a predetermined thickness to manufacture an aluminum alloy brazing sheet according to the present invention. The clad material may be subjected to annealing (intermediate annealing) in the middle of the cold rolling process, or subjected to annealing (final annealing) after the cold rolling process.

In the aluminum alloy brazing sheet according to the present invention, the Mg amount in the brazing material is set to an optimum range such that oxidization of the surface of the brazing material is suppressed and that the oxide film on the surface of the brazing material is weakened at the initial stage of brazing, in brazing in the inert gas atmosphere. In addition, because the Mg content of the core material of the aluminum alloy brazing sheet according to the present invention is limited to 0.05 mass % or less, oxidization of the core material with Mg hardly occurs, and deterioration of brazability due to oxidization of the surface of the core material is suppressed when the core material and the brazing material are brazed.

In the aluminum alloy brazing sheet according to the present invention, when brazing progresses, some of Mg in the intermediate material is diffused and moved into the brazing material, and the Mg content in the brazing material gradually increases. In addition, when the brazing material is molten, Mg in the brazing filler metal reaches the surface of the brazing filler metal at once. In this state, because the oxide film existing on the surface of the brazing material has been weakened at the initial stage of brazing, the oxide film is promptly broken with the brazing filler metal comprising a large amount of Mg diffused from the intermediate material. As a result, a fillet is easily formed between the brazing sheet and the counter material. In addition, the brazing filler metal comprises Bi having the effect of increasing flowability of the brazing filler metal. For this reason, the molten brazing filler metal promptly wet-spreads on a joining portion between the brazing sheet and the counter material, by the combined effect of the effect of weakening the oxide film at the initial stage of brazing and the effect of improving flowability of the brazing filler metal with Bi. In addition, a good fillet is promptly formed by breakage of the oxide film existing in the joining portion at once with a large amount of Mg moved from the intermediate material into the brazing filler metal.

In addition, in the aluminum alloy brazing sheet according to the present invention, because the oxide film on the surface of the brazing material has been weakened before the brazing material is molten as described above, a fillet is promptly formed in the joining portion between the brazing sheet and the counter material with the molten brazing filler metal. Besides, because flowability is improved with Bi added to the brazing material, the brazing filler metal easily gathers in the joining portion. In this manner, a sufficient amount of brazing filler metal is supplied to a position in which formation of a fillet is difficult in a conventional brazing sheet, such as an external surface of a hollow structure, and a good fillet is promptly formed.

The present invention will be specifically explained hereinafter with reference to examples, but the present invention is not limited to the following examples.

EXAMPLES

Examples and Comparative Examples

The core material, the intermediate material, and the brazing material were manufactured using alloys having compositions listed in Table 1. In the alloy compositions listed in Table 1, the symbol "-" indicates that the value is equal to the detection limit or less, and the term "balance" comprises inevitable impurities.

First, the aluminum alloy used for the core material listed in Table 1, the aluminum alloy used for the intermediate material listed in Table 1, and the aluminum alloy used for the brazing material listed in Table 1 were casted by DC casting, and were subjected to facing. The core material and the intermediate material were heated at 600° C., and thereafter the brazing material and the intermediate material were subjected to hot rolling to predetermined thicknesses at 480° C. The hot-rolled intermediate material aluminum alloy and the brazing material aluminum alloy were combined onto one side surface of the core material ingot in order of the core material, the intermediate material, and the brazing material, to obtain a combined material (clad material) having a 10% clad ratio of the intermediate material and a 10% clad ratio of the brazing material. The combined material was heated at 480° C., and thereafter rolled to 2.6 mm by hot clad rolling. Thereafter, the obtained rolled material was subjected to cold rolling to 0.5 mm, and subjected to final annealing to acquire a sample material. In the manufacturing process described above, the case where the test piece could be normally manufactured is denoted by the symbol "0", the case where the material could be manufactured, but longer manufacturing time than the normal case was required and productivity was deteriorated is denoted by the symbol "A", and the case where manufacturing was impossible is denoted by the symbol "x". Table 2 lists the results thereof.

The sample materials prepared as described above were subjected to heating corresponding to brazing at 600° C. for three minutes, and cooled at the speed of 50° C./min. Thereafter, the properties "tensile strength", "brazability", "presence/absence of occurrence of erosion", "corrosion resistance of internal surface general portion", and "corrosion resistance of internal surface joining portion" of each of the sample materials were evaluated by the following methods. Table 2 lists results of the evaluation.

<Tensile Strength>

A JIS No. 5 test piece was cut out of each of the sample materials. The test pieces were subjected to the heating corresponding to brazing described above, left at room temperature for one week, and thereafter subjected to tensile test compliant with JIS Z 2241:2011. The test pieces having the tensile strength of 150 MPa or more were evaluated as "passed" (O), and the test pieces having the tensile strength less than 150 MPa were evaluated as "failed" (x).

<Brazability>

To evaluate the brazability of the brazing material and the core material, clearance filling test was performed. A horizontal sheet having a width of 25 mm and a length of 60 mm was sampled from each of the sample materials. A perpendicular sheet having the same material as that of the horizontal sheet was used, and the brazing material layer and the intermediate layer thereof were removed by polishing to obtain a core material single layer. The sample was subjected to clearance filling test under the condition of the heating corresponding to brazing described above. Thereafter, the filling length was measured, the samples having the filling length of 30 mm or more were evaluated as "OO", the samples having the filling length of 25 mm or more and less than 30 mm were evaluated as "O", and the samples having the filling length less than 25 mm were evaluated as "x". The samples evaluated as "OO" and "O" are samples that passed the test, and the samples evaluated as "x" are samples that failed the test with respect to brazability.

<Presence/Absence of Occurrence of Erosion and Material Melting>

The section of a portion of the horizontal sheet of each of the clearance filling test samples prepared as described above in which no fillet was formed was subjected to micro-observation to check presence/absence of occurrence of erosion (brazing filler metal diffusion) and material melting in the core material and/or the sacrificial anode material. The cases where neither erosion nor material melting occurred were evaluated as "passed" (O), and the cases where at least one of erosion and material melting occurred were evaluated as "failed" (x).

<Corrosion Resistance of Internal Surface General Portion>

The brazing material surface of each of the sample materials subjected to heating corresponding to brazing was subjected to immersion test simulating the environment with a water-based coolant.

The samples were subjected to CASS test for 1,000 hours on the basis of JIS H 8502. As a result, the samples in which no corrosion penetration occurred in the clad material for 1,000 hours were evaluated as "passed" (0) CASS with respect to corrosion resistance, and the samples in which corrosion penetration occurred in the clad material for 1,000 hours were evaluated as "failed" (x) CASS with respect to corrosion resistance.

<Corrosion Resistance of Internal Surface Joining Portion>

A portion of each of the clearance filling test samples in which a fillet was formed was cut out, and subjected to CASS test for 1,000 hours on the basis of JIS H 8502. The samples having a corrosion decrement (volume ratio) less than 10% in the joining portion for 1,000 hours were evaluated as "OO", the samples having a corrosion decrement of 10% or more and less than 30% were evaluated as "O", and the samples having a corrosion decrement of 30% or more were evaluated as "x" with respect to corrosion resistance in CASS.

TABLE 1

| | | Alloy | Alloy Composition (mass %) | | | | | | | |
|---|---|---|---|---|---|---|---|---|---|---|
| | Member | No. | Si | Cu | Mn | Mg | Bi | Sr | Zn | Balance |
| Examples | Core Material | A1 | 0.70 | 1.00 | 1.60 | — | — | — | — | Al |
| | | A2 | 0.50 | 1.00 | 1.60 | — | — | — | — | Al |
| | | A3 | 0.90 | 1.00 | 1.60 | — | — | — | — | Al |
| | | A4 | 0.70 | 0.30 | 1.60 | — | — | — | — | Al |
| | | A5 | 0.70 | 2.50 | 1.60 | — | — | — | — | Al |
| | | A6 | 0.70 | 1.00 | 1.40 | — | — | — | — | Al |
| | | A7 | 0.70 | 1.00 | 1.80 | — | — | — | — | Al |
| | Brazing Material | B1 | 10.00 | — | — | 0.20 | 0.020 | — | — | Al |
| | | B2 | 6.00 | — | — | 0.20 | 0.020 | — | — | Al |
| | | B3 | 13.00 | — | — | 0.20 | 0.020 | — | — | Al |
| | | B4 | 10.00 | — | — | 0.05 | 0.020 | — | — | Al |
| | | B5 | 10.00 | — | — | 0.40 | 0.020 | — | — | Al |
| | | B6 | 10.00 | — | — | 0.20 | 0.010 | — | — | Al |
| | | B7 | 10.00 | — | — | 0.20 | 0.050 | — | — | Al |
| | | B8 | 10.00 | 0.02 | — | 0.20 | 0.020 | — | — | Al |
| | | B9 | 10.00 | 1.20 | — | 0.20 | 0.020 | — | — | Al |
| | | B10 | 10.00 | — | — | 0.20 | 0.020 | 0.001 | — | Al |
| | | B11 | 10.00 | — | — | 0.20 | 0.020 | 0.05 | — | Al |
| | Intermediate Material | C1 | — | — | — | 0.60 | — | — | 4.00 | Al |
| | | C2 | — | — | — | 0.60 | — | — | 2.00 | Al |
| | | C3 | — | — | — | 0.60 | — | — | 6.00 | Al |
| | | C4 | — | — | — | 0.40 | — | — | 4.00 | Al |
| | | C5 | — | — | — | 1.00 | — | — | 4.00 | Al |
| | | C6 | — | — | 0.05 | 0.60 | — | — | 4.00 | Al |
| | | C7 | — | — | 0.50 | 0.60 | — | — | 4.00 | Al |
| Comparative Examples | Core Material | A8 | 0.20 | 1.00 | 1.60 | — | — | — | — | — |
| | | A9 | 1.20 | 1.00 | 1.60 | — | — | — | — | — |
| | | A10 | 0.70 | 0.10 | 1.60 | — | — | — | — | — |
| | | A11 | 0.70 | 2.80 | 1.60 | — | — | — | — | — |
| | | A12 | 0.70 | 1.00 | 0.90 | — | — | — | — | — |
| | | A13 | 0.70 | 1.00 | 2.00 | — | — | — | — | — |
| | | A14 | 0.70 | 1.00 | 1.60 | 0.30 | — | — | — | — |
| | Brazing Material | B12 | 4.00 | — | — | 0.20 | 0.020 | — | — | — |
| | | B13 | 15.00 | — | — | 0.20 | 0.020 | — | — | — |
| | | B14 | 10.00 | 1.50 | — | 0.20 | 0.020 | — | — | — |
| | | B15 | 10.00 | — | — | 0.03 | 0.020 | — | — | — |
| | | B16 | 10.00 | — | — | 0.60 | 0.020 | — | — | — |
| | | B17 | 10.00 | — | — | 0.20 | 0.002 | — | — | — |
| | | B18 | 10.00 | — | — | 0.20 | 0.500 | — | — | — |
| | | B19 | 10.00 | — | — | 0.20 | 0.020 | 0.10 | — | — |
| | Intermediate Material | C8 | — | — | 0.02 | 0.60 | — | — | 4.00 | — |
| | | C9 | — | — | 1.30 | 0.60 | — | — | 4.00 | — |
| | | C10 | — | — | — | 0.60 | — | — | 0.50 | — |
| | | C11 | — | — | — | 0.60 | — | — | 7.00 | — |
| | | C12 | — | — | — | 0.10 | — | — | 4.00 | — |
| | | C13 | — | — | — | 1.50 | — | — | 4.00 | — |

TABLE 2

| | No. | Core Material Alloy No. | Brazing Material Alloy No. | Intermediate Material Alloy No. | Tensile Strength After Brazing (MPa) Tensile Strength (MPa) | Evaluation | Erosion and Material Melting | Brazability | Internal Surface Corrosion Resistance General Portion | Joining Portion | Possibility of Manufacturing of Test Piece |
|---|---|---|---|---|---|---|---|---|---|---|---|
| Examples | 1 | A1 | B1 | C1 | 160 | ○ | ○ | ○ | ○ | ○ | ○ |
| | 2 | A2 | B1 | C1 | 157 | ○ | ○ | ○ | ○ | ○ | ○ |
| | 3 | A3 | B1 | C1 | 163 | ○ | ○ | ○ | ○ | ○ | ○ |
| | 4 | A4 | B1 | C1 | 152 | ○ | ○ | ○ | ○ | ○ | ○ |
| | 5 | A5 | B1 | C1 | 185 | ○ | ○ | ○ | ○ | ○ | ○ |
| | 6 | A6 | B1 | C1 | 157 | ○ | ○ | ○ | ○ | ○ | ○ |
| | 7 | A7 | B1 | C1 | 164 | ○ | ○ | ○ | ○ | ○ | ○ |
| | 8 | A1 | B1 | C1 | 158 | ○ | ○ | ○ | ○ | ○ | ○ |
| | 9 | A1 | B2 | C1 | 170 | ○ | ○ | ○ | ○ | ○ | ○ |
| | 10 | A1 | B3 | C1 | 158 | ○ | ○ | ○ | ○ | ○ | ○ |
| | 11 | A1 | B4 | C1 | 169 | ○ | ○ | ○ | ○ | ○ | ○ |
| | 12 | A1 | B5 | C1 | 161 | ○ | ○ | ○ | ○ | ○ | ○ |
| | 13 | A1 | B6 | C1 | 158 | ○ | ○ | ○ | ○ | ○ | ○ |
| | 14 | A1 | B7 | C1 | 163 | ○ | ○ | ○ | ○ | ○ | ○ |
| | 15 | A1 | B8 | C1 | 169 | ○ | ○ | ○ | ○ | ○○ | ○ |
| | 16 | A1 | B9 | C1 | 155 | ○ | ○ | ○ | ○ | ○○ | ○ |
| | 17 | A1 | B10 | C1 | 159 | ○ | ○ | ○○ | ○ | ○ | ○ |
| | 18 | A1 | B11 | C1 | 157 | ○ | ○ | ○○ | ○ | ○ | ○ |
| | 19 | A1 | B1 | C1 | 169 | ○ | ○ | ○ | ○ | ○ | ○ |
| | 20 | A1 | B1 | C2 | 156 | ○ | ○ | ○ | ○ | ○ | ○ |
| | 21 | A1 | B1 | C3 | 155 | ○ | ○ | ○ | ○ | ○ | ○ |
| | 22 | A1 | B1 | C4 | 159 | ○ | ○ | ○ | ○ | ○ | ○ |
| | 23 | A1 | B1 | C5 | 164 | ○ | ○ | ○ | ○ | ○ | ○ |
| | 24 | A1 | B1 | C6 | 168 | ○ | ○ | ○ | ○ | ○ | ○ |
| | 25 | A1 | B1 | C7 | 170 | ○ | ○ | ○ | ○ | ○ | ○ |
| Comparative Examples | 26 | A8 | B1 | C1 | 135 | × | ○ | ○ | ○ | ○ | ○ |
| | 27 | A9 | B1 | C1 | 172 | ○ | × | ○ | ○ | ○ | ○ |
| | 28 | A10 | B1 | C1 | 130 | × | ○ | ○ | × | ○ | ○ |
| | 29 | A11 | B1 | C1 | 223 | ○ | × | ○ | ○ | ○ | ○ |
| | 30 | A12 | B1 | C1 | 140 | ○ | ○ | ○ | × | ○ | ○ |
| | 31 | A13 | B1 | C1 | — | — | — | — | — | — | × |
| | 32 | A14 | B1 | C1 | 195 | ○ | ○ | × | ○ | ○ | ○ |
| | 33 | A1 | B12 | C1 | 156 | ○ | ○ | × | ○ | ○ | ○ |
| | 34 | A1 | B13 | C1 | 165 | ○ | × | ○ | ○ | ○ | ○ |
| | 35 | A1 | B14 | C1 | — | — | — | — | — | — | × |
| | 36 | A1 | B15 | C1 | 156 | ○ | ○ | × | ○ | ○ | ○ |
| | 37 | A1 | B16 | C1 | 163 | ○ | ○ | × | ○ | ○ | ○ |
| | 38 | A1 | B17 | C1 | 166 | ○ | ○ | × | ○ | ○ | ○ |
| | 39 | A1 | B18 | C1 | — | — | — | — | — | — | × |
| | 40 | A1 | B19 | C1 | 155 | ○ | ○ | × | ○ | ○ | ○ |
| | 41 | A1 | B1 | C8 | 157 | ○ | ○ | ○ | ○ | ○ | Δ |
| | 42 | A1 | B1 | C9 | — | — | — | — | — | — | × |
| | 43 | A1 | B1 | C10 | 156 | ○ | ○ | ○ | × | ○ | ○ |
| | 44 | A1 | B1 | C11 | 160 | ○ | × | ○ | ○ | ○ | ○ |
| | 45 | A1 | B1 | C12 | 159 | ○ | ○ | × | ○ | ○ | ○ |
| | 46 | A1 | B1 | C13 | 161 | ○ | × | ○ | ○ | ○ | ○ |

Table 2 lists evaluation results. In Examples 1 to 25, the samples passed in evaluation of tensile strength after brazing, erosion, brazability, and internal surface corrosion resistance in the general portion and the joining portion, and the test pieces could be normally manufactured.

By contrast, Comparative Example 26 failed in evaluation, because the Si concentration of the core material was low and the tensile strength after brazing was low. Comparative Example 27 failed in evaluation, because the Si concentration of the core material was high, the melting point of the core material was low, and melting of the core material occurred. Comparative Example 28 failed in evaluation, because the Cu concentration of the core material was low and the tensile strength after brazing was low. Comparative Example 29 failed in evaluation, because the Cu concentration of the core material was high, the melting point of the core material was low, and melting of the core material occurred. Comparative Example 30 failed in evaluation, because the Mn concentration of the core material was low and the tensile strength after brazing was low. In addition, Comparative Example 30 also failed in evaluation of corrosion resistance of the general portion, because the potential of the core material was low and a difference in potential thereof from the intermediate layer was small. In Comparative Example 31, manufacturing of the test piece was impossible, because the Mn concentration of the core material was high, a coarse compound was generated in casting, and rollability was deteriorated. Comparative Example 32 failed in evaluation, because the Mg concentration of the core material was high, oxidization progressed during heating in the brazability test, and the clearance filling length was shortened. Comparative Example 33 failed in evaluation, because the Si concentration of the brazing material was low, the flowability of the brazing filler metal was low, and the clearance filling length was shortened. Comparative Example 34 failed in evaluation, because the Si concentration of the brazing material was high, the Si concentration diffused into the core material increased, the melting point of the core material was lowered, and melting of the core material occurred. In Comparative Example 35, manufacturing of the test piece was impossible, because the Cu concentration of the brazing material was high, the strength of the brazing material increased, and the brazing material was not joined to the intermediate material in clad rolling. Comparative Example 36 failed in evaluation, because the Mg concentration of the brazing material was low and the clearance filling length was shortened. Comparative Example 37 failed in evaluation, because the Mg concentration in the brazing material was high, oxidization progressed during heating in the brazability test, and the clearance filling length was shortened. Comparative Example 38 failed in evaluation, because the Bi concentration of the brazing material was low and the clearance filling length was shortened. In Comparative Example 39, manufacturing of the test piece was impossible, because the Bi concentration of the brazing material was high, a coarse Mg—Bi-based compound was generated in casting, and rollability was deteriorated. Comparative Example 40 failed in evaluation, because the Sr concentration in the brazing material was high, oxidization of the surface of the brazing material progressed during heating in the brazability test, and the clearance filling length was shortened. In Comparative Example 41, the test piece could be manufactured, although the Mn concentration of the intermediate material was low, the joining property in clad rolling was poor, time twice as long as time in the normal case was required for manufacturing, and productivity was deteriorated. In Comparative Example 42, manufacturing of the test piece was impossible, because the Mn concentration of the intermediate material was high, the strength of the intermediate material increased, and the joining property in clad rolling was deteriorated.

Comparative Example 43 failed in evaluation of corrosion resistance of the general portion, because the Zn concentration of the intermediate material was low, the potential became positive, and the difference in potential thereof from the core material was small. Comparative Example 44 failed in evaluation, because the Zn concentration of the intermediate material was high, the melting point of the intermediate material was lowered, and melting of the intermediate material occurred. Comparative Example 44 also failed in evaluation of corrosion resistance of the general portion, because the corrosion speed was high. Comparative Example 45 failed in evaluation, because the Mg concentration of the intermediate material was low, the effect of weakening the oxide film was small, and the clearance filling length was shortened. Comparative Example 46 failed in evaluation, because the Mg concentration of the intermediate material was high, the melting point of the intermediate material was low, and melting of the intermediate material occurred.

The invention claimed is:

1. An aluminum alloy brazing sheet used for brazing in an inert gas atmosphere without using a flux, the aluminum alloy brazing sheet comprising:
   a core material;
   an intermediate material cladded onto one side surface of the core material; and
   a brazing material cladded onto a side surface of the intermediate material opposite to a side surface on which the core material exists, wherein
   the core material is formed of aluminum alloy consisting of Si of 0.50 to 0.90 mass %, Cu of 0.30 to 2.50 mass %, and Mn of 1.40 to 1.80 mass %, with a Mg content limited to 0.05 mass % or less, and with the balance being Al and inevitable impurities,
   the intermediate material is formed of aluminum alloy consisting of Mg of 0.40 to 1.00 mass %, and Zn of 2.00 to 6.00 mass %, optionally Mn, with the balance being Al and inevitable impurities, and
   the brazing material is formed of aluminum alloy consisting of Si of 6.00 to 13.00 mass %, Mg of 0.05 to 0.40 mass %, and Bi of 0.010 to 0.050 mass %, optionally Sr, optionally Cu, with the balance being Al and inevitable impurities.

2. The aluminum alloy brazing sheet according to claim 1, wherein the brazing material further comprises Sr of 0.001 to 0.05 mass %.

3. The aluminum alloy brazing sheet according to claim 1, wherein the brazing material further comprises Cu of 0.02 to 1.20 mass %.

4. The aluminum alloy brazing sheet according to claim 1, wherein the intermediate material further comprises Mn of 0.05 to 0.50 mass %.

* * * * *